United States Patent
Gerndt

(10) Patent No.: US 7,198,742 B2
(45) Date of Patent: Apr. 3, 2007

(54) APPARATUS AND METHOD FOR DEFORMING SHEET MATERIAL

(75) Inventor: Robert James Gerndt, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 578 days.

(21) Appl. No.: 10/748,522

(22) Filed: Dec. 30, 2003

(65) Prior Publication Data

US 2005/0140057 A1    Jun. 30, 2005

(51) Int. Cl.
B29C 59/00    (2006.01)

(52) U.S. Cl. ............ 264/156; 264/257; 264/284; 264/286; 264/293; 264/296; 264/322; 264/324

(58) Field of Classification Search ......... 264/284, 264/286–287, 293, 296, 324, 153, 156, 322
See application file for complete search history.

(56) References Cited

U.S. PATENT DOCUMENTS

| | | |
|---|---|---|
| 634,307 A | 10/1899 | Neidhardt |
| 679,425 A | 7/1901 | Kertesz |
| 1,925,582 A | 9/1933 | Couch |
| 1,938,110 A | 12/1933 | Neutelings |
| 2,158,087 A | 5/1939 | Rowe et al. |
| 2,618,012 A | 11/1952 | Milne |
| 2,745,538 A | 5/1956 | Lamb |
| 2,849,781 A | 9/1958 | Rosen |
| 2,856,060 A | 10/1958 | Malnati |
| 2,892,422 A | 6/1959 | Casale |
| 2,988,722 A | 6/1961 | Horn |
| 3,043,244 A | 7/1962 | Engels |
| 3,109,218 A | 11/1963 | Morgan |
| 3,119,152 A | 1/1964 | Kalwaites |
| 3,220,057 A | 11/1965 | Walton |
| 3,235,906 A | 2/1966 | Conti |
| 3,254,148 A | 5/1966 | Nichols |
| 3,257,488 A | 6/1966 | Rasmussen |
| 3,303,547 A | 2/1967 | Kalwaites |
| 3,320,647 A | 5/1967 | Wilford |
| 3,471,363 A | 10/1969 | Schmidt |
| 3,502,763 A | 3/1970 | Hartmann |
| 3,517,098 A | 6/1970 | Rasmussen |
| 3,586,602 A | 6/1971 | Schmidt |

(Continued)

FOREIGN PATENT DOCUMENTS

GB    753603    7/1956

(Continued)

Primary Examiner—Stefan Staicovici
(74) Attorney, Agent, or Firm—Robert A. Ambrose

(57) ABSTRACT

Presented herein is an apparatus and method for deforming a sheet material. The apparatus includes a deforming roller having a plurality of circumferential depressions and at least one cord in rotational engagement with the roller and adapted to press the material into the depressions. The method includes the steps of providing a rotating deforming roller having circumferential depressions, at least one cord aligned to fit within the depressions and at least one sheet material, and feeding the material in a first direction between the roller and cord and deforming the material by pressing it at least partially into the depressions with the cord. The deformation may include stretching or extending the material, and/or aperturing the material, and/or producing topographical shapes or surface features in the material.

12 Claims, 6 Drawing Sheets

U.S. PATENT DOCUMENTS

| | | | |
|---|---|---|---|
| 3,624,874 A | 12/1971 | Lauchenauer | |
| 3,692,618 A | 9/1972 | Dorschner et al. | |
| 3,708,831 A | 1/1973 | Burger | |
| 3,802,817 A | 4/1974 | Matsuki et al. | |
| 3,849,241 A | 11/1974 | Butin et al. | |
| 3,890,422 A | 6/1975 | Livingston | |
| 3,947,538 A | 3/1976 | Marshall et al. | |
| 3,953,909 A | 5/1976 | Yazawa et al. | |
| 4,087,226 A | 5/1978 | Mercer | |
| 4,116,892 A | 9/1978 | Schwarz | |
| 4,336,638 A | 6/1982 | Mercer | |
| 4,340,563 A | 7/1982 | Appel et al. | |
| 4,349,500 A | 9/1982 | Yazawa et al. | |
| 4,368,565 A | 1/1983 | Schwarz | |
| 4,420,300 A * | 12/1983 | Winstead | 425/142 |
| 4,434,128 A | 2/1984 | Okada et al. | |
| 4,525,317 A | 6/1985 | Okada et al. | |
| 4,987,663 A | 1/1991 | Epple | |
| 5,028,289 A | 7/1991 | Rasmussen | |
| 5,043,036 A | 8/1991 | Swenson | |
| 5,108,820 A | 4/1992 | Kaneko et al. | |
| 5,142,751 A | 9/1992 | Senba | |
| 5,167,897 A | 12/1992 | Weber et al. | |
| 5,272,236 A | 12/1993 | Lai et al. | |
| 5,278,272 A | 1/1994 | Lai et al. | |
| 5,332,613 A | 7/1994 | Taylor et al. | |
| 5,336,552 A | 8/1994 | Strack et al. | |
| 5,382,400 A | 1/1995 | Pike et al. | |
| 5,422,172 A | 6/1995 | Wu | |
| 5,455,992 A | 10/1995 | Kurschatke et al. | |
| 5,517,737 A | 5/1996 | Viltro et al. | |
| 5,522,203 A | 6/1996 | Lancaster, III et al. | |
| 5,539,056 A | 7/1996 | Yang et al. | |
| 5,596,052 A | 1/1997 | Resconi et al. | |
| 5,809,624 A | 9/1998 | Nakamae et al. | |
| 5,826,314 A | 10/1998 | Aihara et al. | |
| 5,861,074 A | 1/1999 | Wu | |
| 5,996,195 A | 12/1999 | White et al. | |
| 6,024,907 A * | 2/2000 | Jagunich | 264/284 |
| 6,260,887 B1 * | 7/2001 | Fujii et al. | 284/264 |
| 6,383,431 B1 | 5/2002 | Dobrin et al. | |
| 2001/0035257 A1 | 11/2001 | Fujii et al. | |
| 2002/0034912 A1 | 3/2002 | Curro et al. | |
| 2002/0089087 A1 | 7/2002 | Mushaben | |

FOREIGN PATENT DOCUMENTS

| | | | |
|---|---|---|---|
| GB | 921138 | | 3/1963 |
| JP | 02-134484 | * | 5/1990 |
| WO | WO 91/15367 | | 10/1991 |
| WO | WO 01/09424 | | 2/2001 |
| WO | WO 2004/020174 | | 3/2004 |

* cited by examiner

APPARATUS AND METHOD FOR DEFORMING SHEET MATERIAL

BACKGROUND OF THE INVENTION

Many of the medical care garments and products, protective wear garments, mortuary and veterinary products, and personal care products in use today are partially or wholly constructed of sheet materials such as extruded filamentary or fibrous web materials such as nonwoven web materials and extruded polymeric film materials. Examples of such products include, but are not limited to, medical and health care products such as surgical drapes, gowns and bandages, protective workwear garments such as coveralls and lab coats, and infant, child and adult personal care absorbent articles such as diapers, training pants, disposable swimwear, incontinence garments and pads, sanitary napkins, wipes and the like. Other uses for nonwoven web materials and polymeric film materials include geotextiles and house wrap materials. For these applications the sheet materials provide functional, tactile, comfort and/or aesthetic properties.

The properties of sheet materials may be altered to produce desired characteristics. It is known to cause a transverse or cross machine direction stretch or extension to a sheet material, for example to increase its width, or to make the sheet material more readily extendible in subsequent use, or to cause orientation of the molecules of an orientable polymeric sheet material. It is also known to produce topographical or surface features in sheet materials to provide, for example, aesthetic visual and/or tactile properties. In addition, it is known to produce apertures in sheet materials to provide aesthetic visual and/or tactile properties as well as altering the fluid handling characteristics of the sheet material. Notwithstanding the foregoing, there exists a continuing need for apparatus and methods for deforming sheet materials, for these and other applications.

SUMMARY OF THE INVENTION

The present invention provides an apparatus and method useful for deforming sheet materials. The apparatus includes a deforming roller having a plurality of circumferential depressions and at least one cord in rotational engagement with the roller and adapted to press the sheet material into the circumferential depressions. In embodiments, the circumferential depressions may be depressions formed between land areas on the roller, or may be grooves formed between circumferential peaks. The cord may be a single unending cord carried on guide rolls. The roller may further include projections adapted to aperture the material. The apparatus may further comprise a heater adapted to apply heat to the sheet material.

The method includes the steps of providing a rotating deforming roller having a plurality of circumferential depressions, providing at least one cord aligned to fit within the depressions, providing at least one sheet material, feeding the material in a first direction between the roller and the cord, and deforming the material by pressing it at least partially into the depressions with the cord. The deformation of the sheet material may include extension of the sheet material in a direction substantially perpendicular to the first direction, aperturing of the sheet material, or forming topographical features in the sheet material, or any combination. The method may desirably further include applying heat to the sheet material. Sheet materials which may be suitably deformed by the apparatus and method include but are not limited to nonwoven web materials and film materials, and laminates thereof.

DEFINITIONS

Figure 1A:
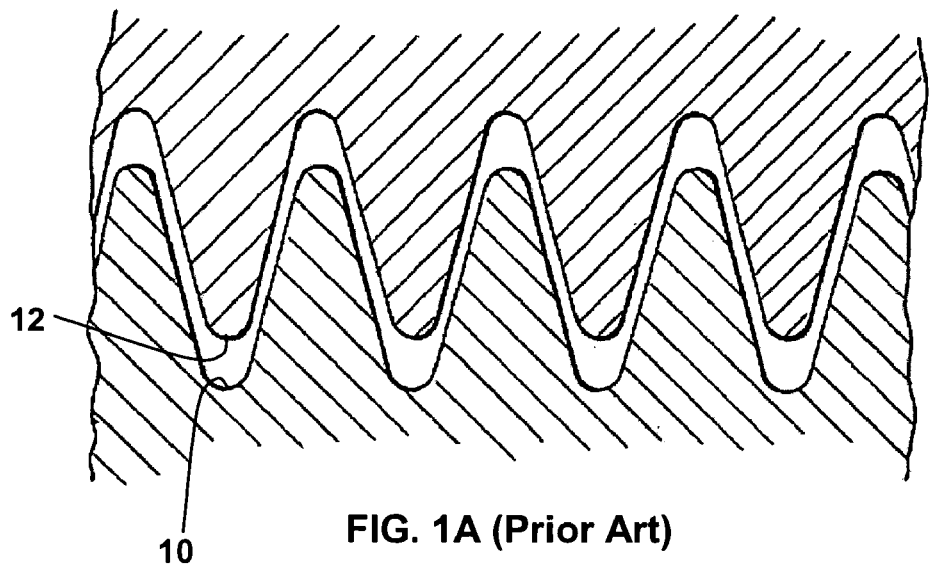
FIGS. 1A and 1B schematically illustrate a partial view of a grooved rolling apparatus of the prior art.

As used herein and in the claims, the term "comprising" is inclusive or open-ended and does not exclude additional unrecited elements, compositional components, or method steps. Accordingly, the term "comprising" encompasses the more restrictive terms "consisting essentially of" and "consisting of".

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to isotactic, syndiotactic and random symmetries. As used herein the term "thermoplastic" or "thermoplastic polymer" refers to polymers that will soften and flow or melt when heat and/or pressure are applied, the changes being reversible.

As used herein the term "fibers" refers to both staple length fibers and substantially continuous filaments, unless otherwise indicated. As used herein the term "substantially continuous" with respect to a filament or fiber means a filament or fiber having a length much greater than its diameter, for example having a length to diameter ratio in excess of about 15,000 to 1, and desirably in excess of 50,000 to 1.

As used herein the term "monocomponent" filament refers to a filament formed from one or more extruders using only one polymer. This is not meant to exclude filaments formed from one polymer to which small amounts of additives have been added for color, anti-static properties, lubrication, hydrophilicity, etc.

As used herein the term "multicomponent filaments" refers to filaments that have been formed from at least two component polymers, or the same polymer with different properties or additives, extruded from separate extruders but spun together to form one filament. Multicomponent filaments are also sometimes referred to as conjugate filaments or bicomponent filaments, although more than two components may be used. The polymers are arranged in substantially constantly positioned distinct zones across the cross-section of the multicomponent filaments and extend continuously along the length of the multicomponent filaments. The configuration of such a multicomponent filament may be, for example, a concentric or eccentric sheath/core arrangement wherein one polymer is surrounded by another, or may be a side by side arrangement, an "islands-in-the-sea" arrangement, or arranged as pie-wedge shapes or as stripes on a round, oval or rectangular cross-section filament, or other configurations. Multicomponent filaments are taught in U.S. Pat. No. 5,108,820 to Kaneko et al., U.S. Pat. No. 5,336,552 to Strack et al., and U.S. Pat. No. 5,382,400 to Pike et al. For two component filaments, the polymers may be present in ratios of 75/25, 50/50, 25/75 or any other desired ratios. In addition, any given component of a multicomponent filament may desirably comprise two or more polymers as a multiconstituent blend component.

As used herein the terms "biconstituent filament" or "multiconstituent filament" refer to a filament formed from at least two polymers, or the same polymer with different properties or additives, extruded from the same extruder as a blend. Multiconstituent filaments do not have the polymer components arranged in substantially constantly positioned distinct zones across the cross-section of the multicomponent filaments; the polymer components may form fibrils or protofibrils that start and end at random.

As used herein the terms "nonwoven web" or "nonwoven fabric" refer to a web having a structure of individual filaments or filaments that are interlaid, but not in an identifiable manner as in a knitted or woven fabric. Nonwoven fabrics or webs have been formed from many processes such as for example, meltblowing processes, spunbonding processes, airlaying processes, and carded web processes. The basis weight of nonwoven fabrics is usually expressed in grams per square meter (gsm) or ounces of material per square yard (osy) and the filament diameters useful are usually expressed in microns. (Note that to convert from osy to gsm, multiply osy by 33.91).

The terms "spunbond" or "spunbond nonwoven web" refer to a nonwoven fiber or filament material of small diameter filaments that are formed by extruding molten thermoplastic polymer as filaments from a plurality of capillaries of a spinneret. The extruded filaments are cooled while being drawn by an eductive or other well known drawing mechanism. The drawn filaments are deposited or laid onto a forming surface in a generally random manner to form a loosely entangled filament web, and then the laid filament web is subjected to a bonding process to impart physical integrity and dimensional stability. The production of spunbond fabrics is disclosed, for example, in U.S. Pat. No. 4,340,563 to Appel et al., U.S. Pat. No. 3,692,618 to Dorschner et al., and U.S. Pat. No. 3,802,817 to Matsuki et al. Typically, spunbond fibers or filaments have a weight-per-unit-length in excess of about 1 denier and up to about 6 denier or higher, although both finer and heavier spunbond filaments can be produced. In terms of filament diameter, spunbond filaments often have an average diameter of larger than 7 microns, and more particularly between about 10 and about 25 microns, and up to about 30 microns or more.

As used herein the term "meltblown fibers" means fibers or microfibers formed by extruding a molten thermoplastic material through a plurality of fine, usually circular, die capillaries as molten threads or filaments or fibers into converging high velocity gas (e.g. air) streams that attenuate the fibers of molten thermoplastic material to reduce their diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Buntin. Meltblown fibers may be continuous or discontinuous, are often smaller than 10 microns in average diameter and are frequently smaller than 7 or even 5 microns in average diameter, and are generally tacky when deposited onto a collecting surface.

DETAILED DESCRIPTION OF THE INVENTION

The present invention provides an apparatus and method for deforming sheet materials including but not limited to nonwoven web materials, polymeric film materials, and laminates of nonwoven webs with other nonwoven webs and/or polymeric film materials, and other materials as are hereinafter described. The invention will be described with reference to the following Figures which illustrate certain embodiments. It will be apparent to those skilled in the art that these embodiments do not represent the full scope of the invention which is broadly applicable in the form of variations and equivalents as may be embraced by the claims appended hereto. Furthermore, features described or illustrated as part of one embodiment may be used with another embodiment to yield still a further embodiment. It is intended that the scope of the claims extend to all such variations and equivalents.

Figure 1B:
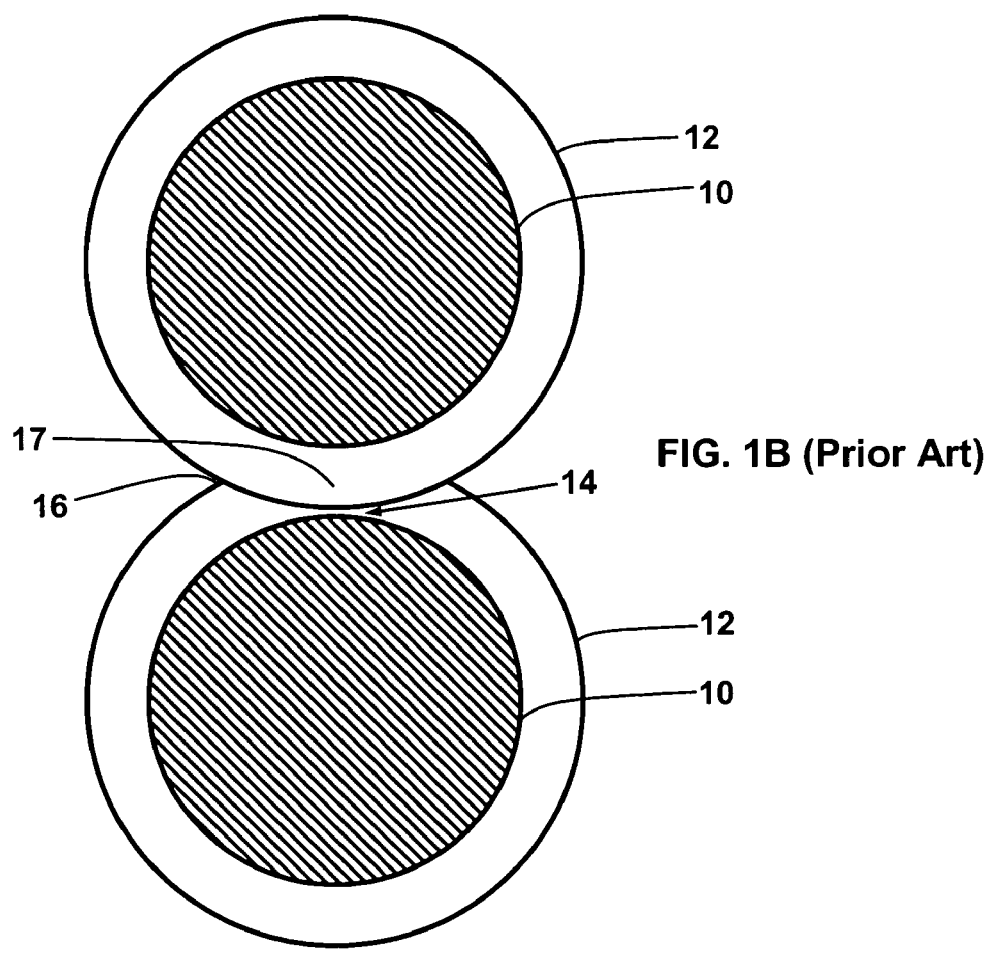

FIGS. 1A and 1B illustrate schematically intermeshing grooved rollers such as are known in the art. FIG. 1A is a cut-away partial view along the length of the rollers showing the profile of the nip formed between the rollers. The grooved rollers have circumferential grooves or depressions 10 and circumferential peaks 12. The peaks 12 on one intermeshing roller are designed to fit within the depressions 10 on the opposing or matching roller and thereby force a sheet material down into the grooves in order to deform the material such as by stretching or extending the material. FIG. 1B is a side cut away view of the rollers depicting for each roller a smaller or inner circumference which defines the bottom of the depression 10 and a larger or outer circumference which defines the peaks 12. As can also be seen in FIG. 1B, a gap 14 is defined between the peak circumference 12 on the top roller (in this view) and the groove circumference 10 on the bottom roller. Such rollers as are known in the art are useful for extending or stretching sheet materials. However, great care must be taken to ensure the two rollers match one another well for proper alignment during intermeshing to avoid damage to the sheet material or to the rollers themselves, and this may be a particular problem where it is desired to have a high number of peaks and grooves per unit length of the rollers.

Figure 2:
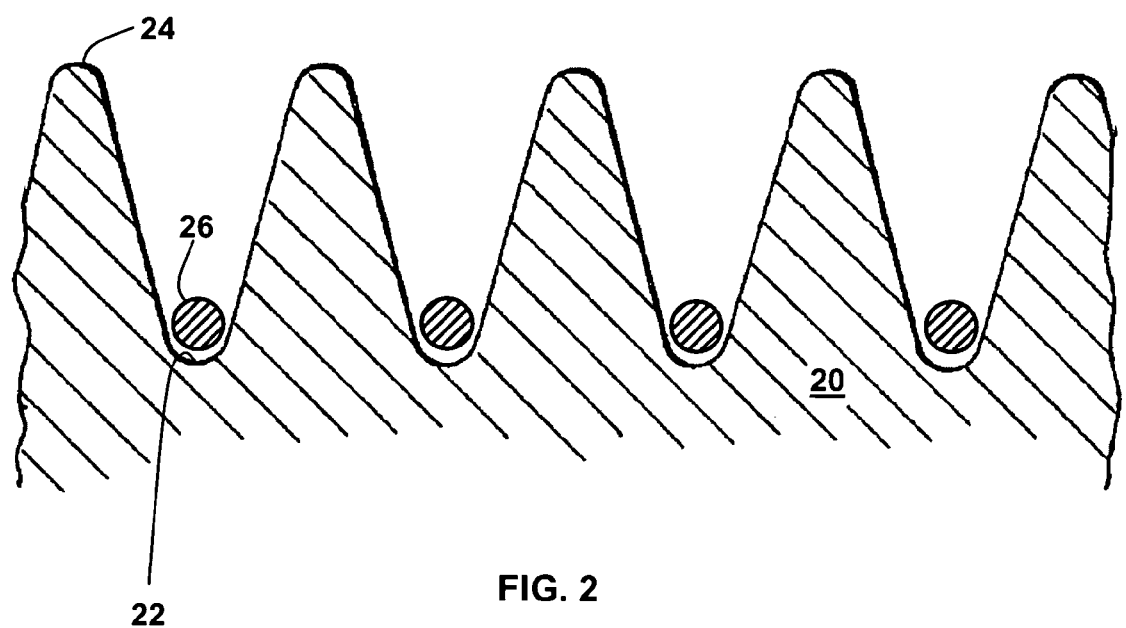
FIG. 2 schematically illustrates a partial view of an embodiment of the apparatus of the invention.

Turning to FIG. 2, a portion of the apparatus of the invention is illustrated schematically. The apparatus comprises at least one deforming roller having circumferential depressions, such as the deforming roller 20 shown in a cut away partial view along the length of the roller. The deforming roller 20 may be similar to those known in the art and roller 20 shown in FIG. 2 is similar to the roller shown in FIG. 1A, having a plurality of circumferential depressions 22 and a plurality of circumferential peaks 24. However, according to the invention, rather than using a second matching roller to form a nip, the invention uses cords 26 which are shown in cross section. Cords 26 are adapted to fit at least partially within the depressions and thereby are able to press a sheet material into the circumferential depressions.

Cords 26 may be any flexible material adapted to press a sheet material into the circumferential depressions, such as for example monofilament cords, or cords made from a plurality of fibers such as braided or woven ropes, twines, wires or cables. Because the invention utilizes flexible cords with the deforming roller, the invention avoids the alignment issues of the intermeshing grooved rollers as are known in the art. Desirably, a cord material should be flexible enough to be capable of pressing the sheet material into the circumferential depressions as was stated above, and should also be strong enough to avoid breakage under applied tension. Such cord materials may be produced from glass fiber, metal wire, aramid fibers, carbon fibers, or other organic or inorganic fibrous materials as are known in the art. An exemplary cord material is commercially available from the Cortland Cable Company, Cortland, N.Y. as a braided cord material comprising high performance fibers such as the liquid crystal polymer fibers sold under the VECTRAN® trade name and available from Celanese Acetate LLC (Charlotte, N.C.). Desirably, the cords will have a substantially circular cross section as shown in FIG. 2. However, the shape of the cord is not critical and other cross sectional shapes, such as for example an oval shape, may be used. It should be noted that cross sectional shapes having sharp edges should be avoided where it is desired to minimize potential damage to the sheet material being deformed.

Figure 3:
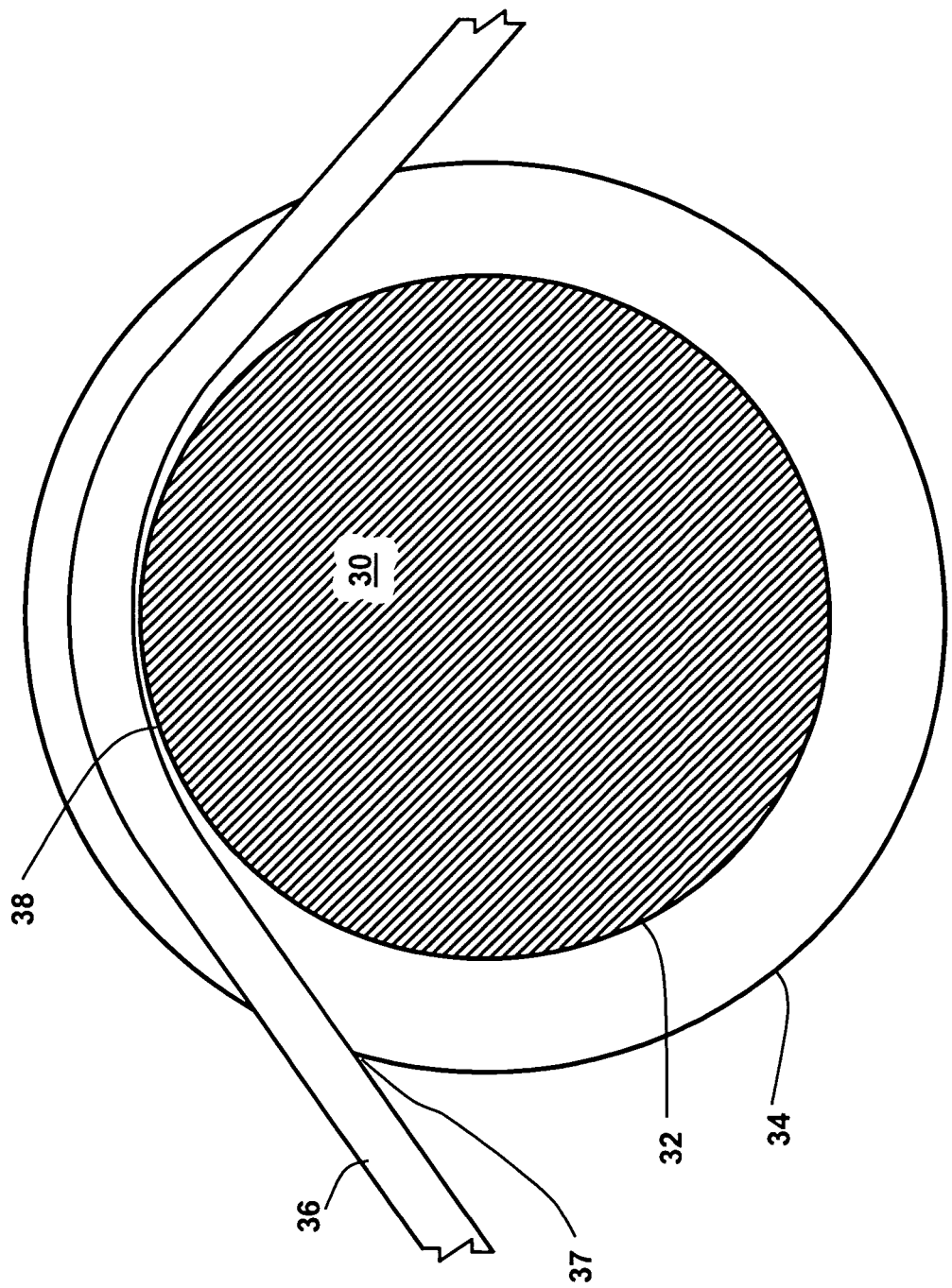
FIG. 3 schematically illustrates a partial side view of an embodiment of the apparatus of the invention.

Turning to FIG. 3 there is illustrated schematically in side cut away view a portion of the apparatus. In FIG. 3, a roller 30 is shown enlarged and cut away and may be similar to one of the rollers shown previously. Roller 30 comprises an inner or smaller circumference which defines the bottom of the circumferential depression 32 and an outer or larger circumference defining the circumferential peak 34. The apparatus in FIG. 3 further shows cord 36 engaged with the roller 30 such that the cord is fitted within the depression 32. Also marked in FIG. 3 are the points 37 and 38. In use, as a sheet material (not shown in FIG. 3) is fed through the apparatus (for example, from left to right of FIG. 3), the sheet material first begins to become deformed at the point marked 37 as the cord 36 begins to press the sheet material into the depression. As the sheet material travels farther into the apparatus it is pressed more deeply into the depression until the cord becomes tangent to the circumferential depression 32, whereupon the sheet material reaches a point of maximum deformation which is designated point 38 in FIG. 3. The sheet-travel distance between the points 37 and 38 defines a lateral or feed-direction distance the sheet material travels during which it is deformed by being pressed into the depression.

Returning briefly to FIG. 1B, points 16 and 17 are marked for the conventional paired grooved rollers which are similar to points 37 and 38 in FIG. 3. Point 16 corresponds to the point at which (for a sheet material being fed into the apparatus from left to right in FIG. 1B) the sheet material first begins to be deformed by pressing into the depression, and point 17 corresponds to the point of maximum deformation. As can be seen by comparing FIG. 3 with FIG. 1B, the lateral or feed-direction distance the sheet material travels during deformation is larger in FIG. 3 than in FIG. 1B, for an equivalent deformation and where the grooved roll in FIG. 3 has equivalent dimensions to the rolls in FIG. 1B. Where the deformation the sheet material is intended to undergo is stretching or extending in the cross-machine direction, this aspect of the invention can be important in avoiding excessive damage to the sheet material. This is because the rate of strain (amount of extension per unit time) is reduced by having the sheet material undergo the same amount of strain but over a longer travel distance, and therefore over a longer period of time (for sheet materials being fed at the same speed).

Figure 4:
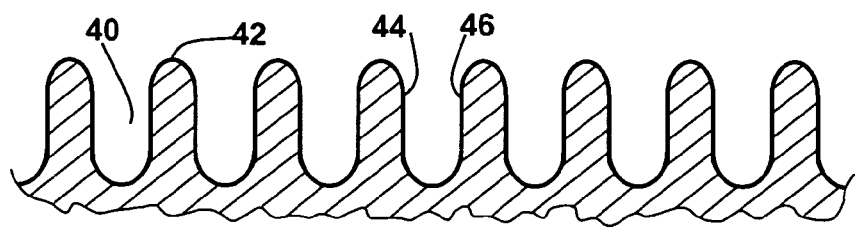
FIGS. 4–5 schematically illustrate other embodiments of a portion of the apparatus of the invention.
Figure 5:
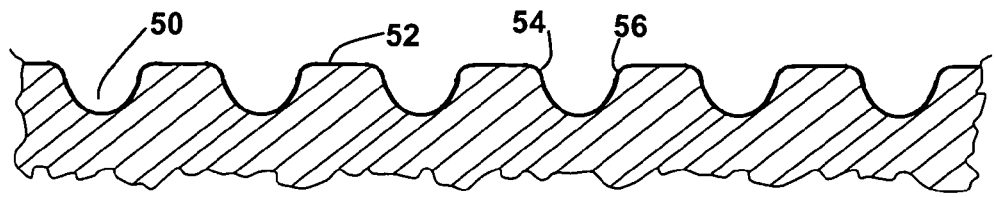

As was mentioned, deforming rollers suitable for use with the invention may be similar to those known in the art and the exact type of roller is not critical, so long as the deforming roller comprises circumferential depressions which are capable of accepting the sheet material when the cords deform the sheet material into the circumferential depressions. FIG. 4 schematically illustrates in partial cutaway view a profile of a deforming roller having circumferential depressions 40 defined as grooves between circumferential peaks 42. As shown in FIG. 4, the side walls 44, 46 of the depressions may be substantially parallel, although they need not be so and it may be desirable for the depression sidewalls to be inclined somewhat toward the bottom center of the depression. Also as shown in FIG. 4, it may be desirable for the peaks to have somewhat rounded tops, to help avoid excessive damage to the sheet material. Another suitable deforming roller is illustrated in FIG. 5, the roller having circumferential depressions 50 which are cut or milled or otherwise formed into the otherwise flat outer surface or land areas 52 of the deforming roller. As shown, it may be desirable for the circumferential depressions 50 to have curved or radiused interfaces 54, 56 with the land areas 52. Having curved or radiused interfaces may avoid tearing or excessive damage to the sheet material during deformation, especially where stretching or extending is included as a part of the deformation being performed.

Figure 6:
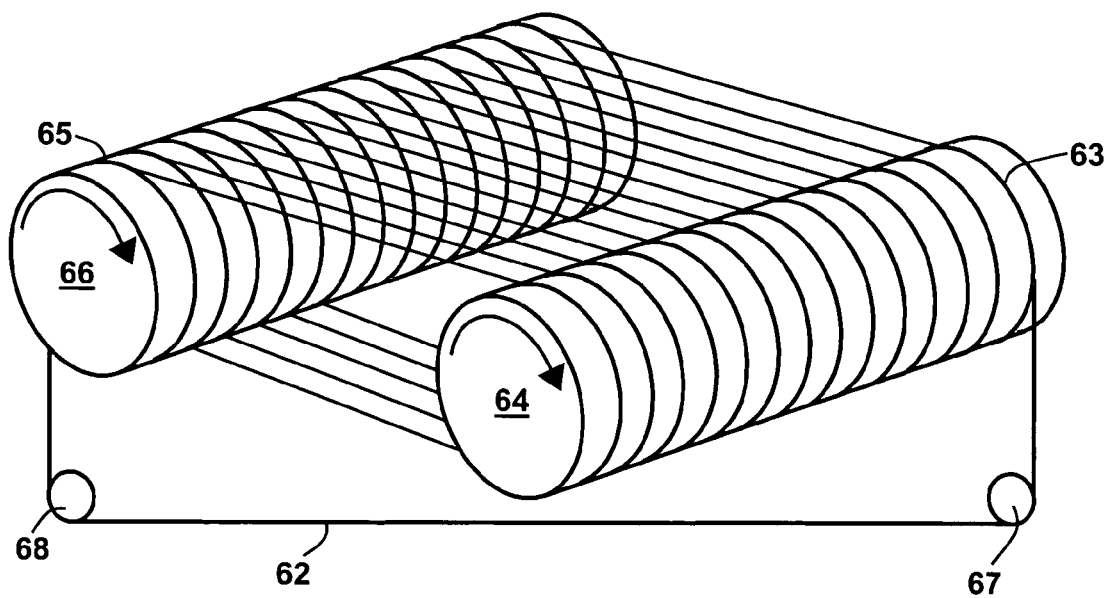
FIG. 6 schematically illustrates an embodiment of a portion of the apparatus of the invention.

As was mentioned, the cord material for use in the invention may be any flexible material that is able to press the sheet material to be deformed into the circumferential depressions of the deforming roller. The cords may be supplied as shown in FIG. 6, as an unending cord arranged in a number of loops of the cord matching the number of circumferential depressions into which it is desired to deform the sheet material. As shown in FIG. 6, the cord 62 travels around two guide rollers 64 and 66 which have circumferential guide depressions or tracks on their outer surfaces to hold the cord loops. The cord travels around the guide rollers in a helical pattern wherein the cord upon leaving the bottom of a front-most circumferential guide track of one roller 64 then travels across to the second front-most circumferential guide track of the other roller 66. After the cord 62 has traveled the lengths of both guide rollers it is returned to its starting position at the front-most circumferential guide track 65 of roller 66 via the pulleys 67 and 68 mounted below the two guide rollers (pulley mountings not shown). It will be appreciated that the pulleys 67 and 68 are oriented such that the cord 62 travels off the last guide track 63 on the distal end of guide roller 64 downward to and around pulley 67 and is directed diagonally under the two guide rollers to pulley 68 mounted under the proximal or front end of guide roller 66, to travel upward to the first or front-most guide track 65 on the proximal end of guide roller 66. Not all of the bottom cord travel paths are shown for clarity. As used with respect to FIG. 6, "distal" means farther away from the view and "proximal" means closer.

The cord material for use in the invention may alternatively be supplied as a number of cords each arranged in a single loop and guided around two or more rollers having guide tracks. This alternative arrangement is also particularly suitable where it may be desired to deform only a portion of the width of the sheet material, by eliminating one or more of the loops of the cord material. In addition, where it may be desired to deform one portion of the sheet material to a certain extent and another portion or portions of the sheet material to a different extent, this may be accomplished by having one or more cord loops having different properties (e.g., cord tension, cord diameter, cord extensibility) than one or more other cord loops. Alternatively, where it may be desired to deform one portion of the sheet material to a certain extent and another portion or portions of the sheet material to a different extent, this may be accomplished by utilizing a deforming roller with the circumferential depressions and/or peaks or land areas as discussed with respect to FIGS. 4 and 5, except that for certain areas where it is desired to deform the sheet material to a lesser extent the depressions and/or peaks/land areas on the deforming roller may be of smaller magnitude than in other areas, or the roller may have areas which are absent of any depressions, where it may be desired to have areas of the sheet remain substantially non-deformed.

Figure 7:
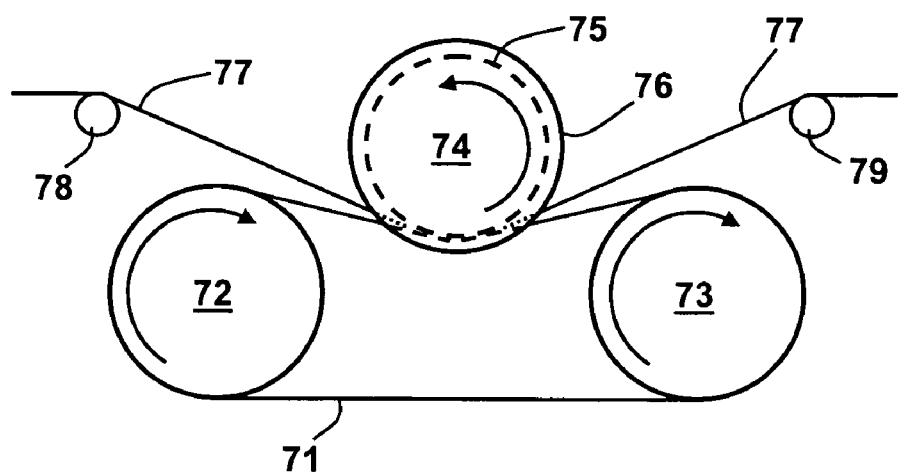
FIG. 7 schematically illustrates an embodiment of the apparatus of the invention.

FIG. 7 shows in side view an embodiment of the apparatus for deforming a sheet material. FIG. 7 includes the guide rollers 72 and 73 around which cord material 71 travels. As mentioned above, cord material 71 may be either a number of cords each arranged in a single loop or may be an endless loop traveling a helix about the guide rollers as was discussed with respect to FIG. 6. Also shown in FIG. 7 is the deforming roller 74. Deforming roller 74 includes a plurality of circumferential depressions 75 (shown in phantom) as a smaller or inner circumference defined between a plurality of larger or outer circumferences 76 which may be peaks or flat land areas as described in the various embodiments above. Desirably in the embodiment shown, either the deforming roller 74 or the guide rollers 72, 73 is capable of vertical movement to allow for levels of cord engagement ranging from completely disengaged (i.e., space between the deforming roller and the cords) up to the deforming roller 74 being nearly fully wrapped about its circumference by the cords. More particularly, it is contemplated that the cord engagement level may range from about a 5 degree wrap or arc of the cords on the deforming roller up to about a 270 degree wrap. Still more particularly, the cord engagement level may desirably range from about a 15 degree wrap to about a 180 degree wrap.

In use, a sheet material 77 such as for example a nonwoven web or polymeric film or a laminate material is fed through the apparatus in the cord travel direction (left to right as viewed in FIG. 7). The cord guide rolls 72 and 73 are desirably driven rolls such that the cord may be pressed into rotational engagement with the driven deforming roller 74. The sheet material 77 may be unwound from a roll (not shown) or may be just-produced sheet material. As mentioned above, as the sheet material 77 is fed through the apparatus the cords press the sheet material into the depressions on the deforming roller. The amount of pressure applied by the cords will depend on process factors such as the tension on the cords between guide rolls 72 and 73, the diameter of deforming roller 74, and the level of engagement between deforming roller 74 and the cords. The sheet material 77 may desirably be directed into and out of the apparatus by driven or idle rollers as are known in the art such as the rollers 78 and 79 depicted in FIG. 7. It should be noted that other alternatives of the apparatus shown in FIG. 7 are possible. For example, the arrangement of the deforming roller and guide rollers may desirably be rearranged such that the deforming roller is below the cord run and engages the cords from below, or the cord run may be arranged in a vertical position and the deforming roller may then engage the cords from one side or the other.

Figure 8:
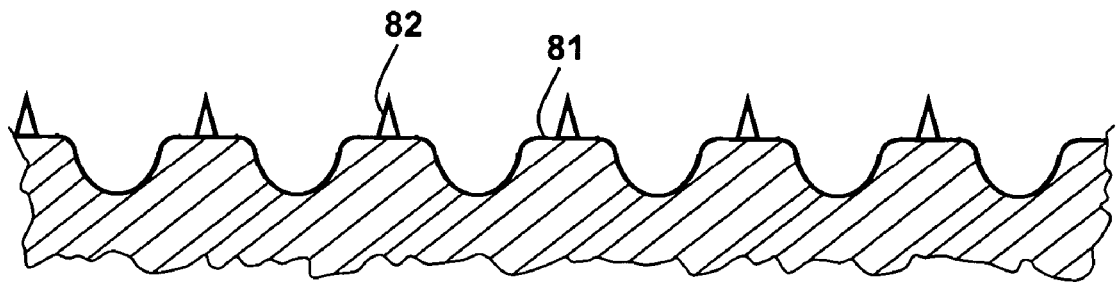
FIG. 8 schematically illustrates a partial view of an embodiment of the apparatus of the invention.

The deforming rollers depicted in FIGS. 4 and 5 are well suited to sheet material deformation such as cross machine direction stretching or extending, and also well suited for deformation such as imparting topography to the sheet material such as by producing or forming three dimensional surface features in the material. FIG. 8 schematically illustrates in partial cut-away view a profile of another deforming roller similar to the deforming roller that was shown in FIG. 5. However, in FIG. 8 the deforming roller additionally includes a plurality of pins 82 which may be utilized for aperturing the sheet material. The pins 82 are essentially points having conical or ellipse-shaped base cross sections which are placed on land areas 81 at circumferentially spaced apart locations (or, alternatively, positioned on circumferential peaks for a roller such as was shown in FIG. 4). Although the pins 82 shown in FIG. 8 are shown on each of the land areas shown in FIG. 8, various patterns of aperturing pins, such as offset or alternating pin positioning patterns, or positioning of pins on certain circumferential land areas but not others, or other patterns, may be desirable depending on desired use of the sheet material. When using a deforming roller having aperturing pins the sheet material may of course be deformed by being apertured, but it may optionally also be deformed by being stretched or extended in the cross machine direction at the same time, and topographical features may also be impressed into or onto the sheet material at the same time.

In other embodiments, the sheet material may desirably be heated before, during, and/or after the deformation process. Heat may be applied by methods known in the art, such as by heated air, contact with heated surfaces (including deforming rollers or cords), infrared or other electromagnetic radiation, etc. Depending on the type of material to be deformed and the type of deformation contemplated, application of heat may facilitate the deformation process. For example, heating of the sheet material prior to and/or during deformation may facilitate stretching/extending type deformations, particularly where the sheet material to be deformed comprises thermoplastic materials, by allowing the sheet material to relax somewhat and be more capable of extension without damage. Heat before, during or after aperturing type deformations may be desirable to help "set" the apertures. Where it is desired that a sheet material which has been deformed by cross machine direction stretching or extension maintain or retain some or all of its new extended width configuration, application of heat after and/or during the deformation may be beneficial in setting or "annealing" the sheet material. It should be mentioned, however, that it is also at times desirable to extend a sheet material only temporarily and then have it return to its original width configuration, thereby forming a sheet material which is more easily capable of subsequent extension.

Heat may also be beneficially used where the desired deformation is adding topographical or surface features to a sheet material. As an example, while a sheet material is fed through the apparatus and it is pressed into the depressions of a deforming roller, the sheet material will at least temporarily take on the shape of the circumferential depressions and/or peaks or land areas, and may also permanently take on the shape of the depressions to a small extent, thereby becoming somewhat corrugated. By applying heat to the sheet material the corrugated topography may be more permanently set and/or set to a greater extent. Other types of topographical deformations or surface features and other shapes may be produced by use of a deforming roller having differently shaped circumferential depressions and/or circumferential peaks or land areas.

It should also be noted that the invention is also particularly advantageous with respect to setting topographical or surface features into a sheet material where setting of the surface features is dependent on either or both of set time or setting temperature, because the amount of wrap of the cords (and thus amount of wrap of the sheet material being deformed) on the deforming roller may be varied to suit the processing needs of the desired end product. Because the invention is capable of holding or pressing the sheet material in intimate rotational contact against of the deforming roller throughout a substantial duration of the deforming roller's rotational travel (e.g., from less than 5 degrees of wrap on the deforming roller to in excess of 270 degrees of wrap on the deforming roller, where desired), and because the cords are capable of deforming the sheet material directly into the circumferential grooves of the deforming roller under pressure, sufficient dwell time and contact pressure to ensure adequate heat transfer may be achieved.

Figure 9:
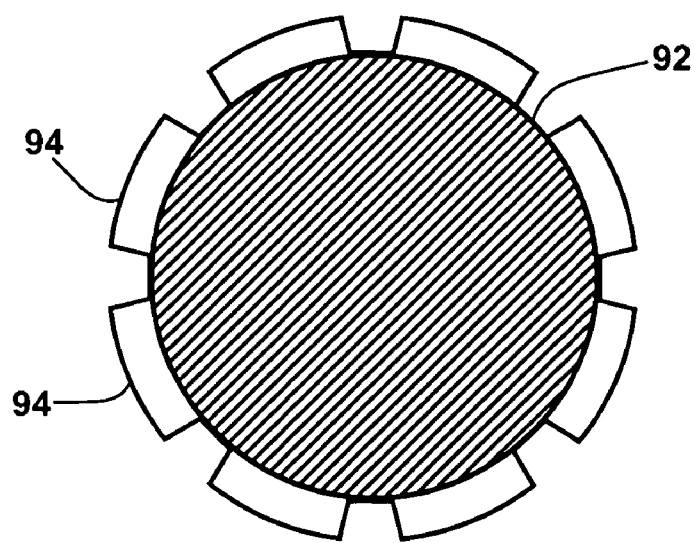
FIG. 9 schematically illustrates a partial side view of an embodiment of the apparatus of the invention.
Figure 10:
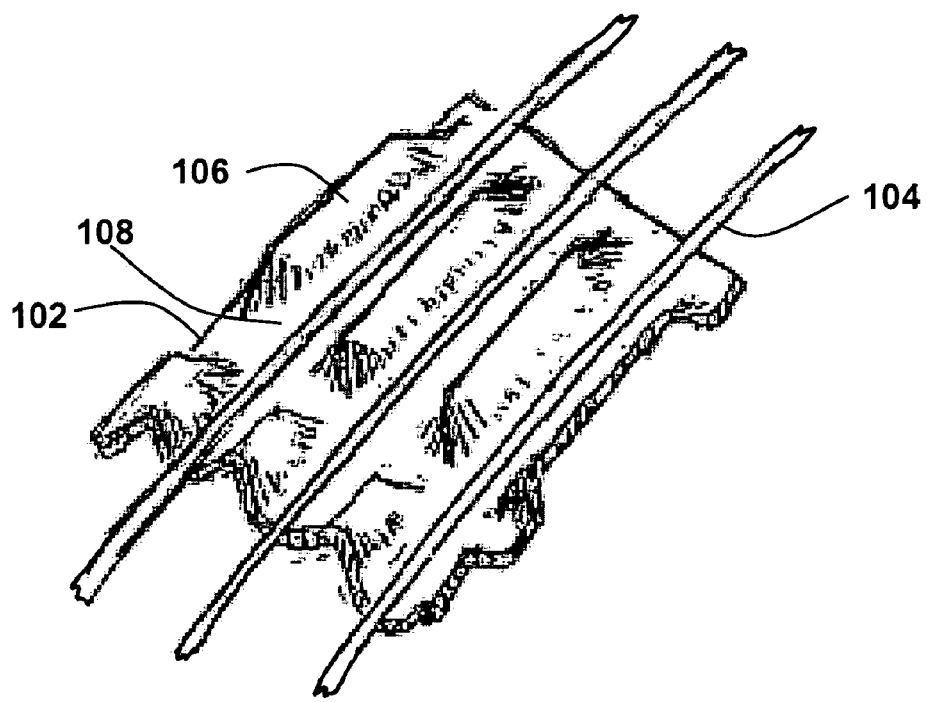
FIG. 10 schematically illustrates a sheet material undergoing deformation.

As an example of sheet material deformation including production of topographical or surface features in the sheet material, the deforming roller illustrated schematically in side cut away view in FIG. 9 comprises an inner or smaller circumference which defines the bottom of the circumferential depression 92 and an outer or larger discontinuous circumference defining interrupted circumferential peaks 94. Such a deforming roller may be used to produce a sheet material having topographical or surface features as is illustrated in FIG. 10. FIG. 10 shows sheet material 102 while it is being deformed by having cords 104 pressing the sheet material 102 into a deforming roller (not shown in FIG. 10) such as the one illustrated in FIG. 9 having discontinuous peaks. Because the peaks are discontinuous, while pressed into the depressions the sheet material takes on the shape of the peaks and exhibits mound-like raised areas 106 surrounded by flatter areas 108. After exiting the apparatus, such a sheet material may retain some or all of the topographical deformations, or it may be desirable to further set such topography by applying heat to the sheet material. Other alternative shapes than the one illustrated in FIGS. 9 and 10 are of course possible. Generally speaking, it should also be noted that topographical type deformations may also be combined with stretching or extending deformation and/ or with aperturing deformation.

Although the embodiments of the invention have been described with respect to deforming sheet materials such as nonwoven web materials, polymeric film materials, and laminates of nonwoven webs with other nonwoven webs and/or polymeric film materials, it is believed that the invention is not limited thereto and aspects of the invention may also be beneficially used for other types of deformable sheet materials such as for example to deform textile type materials. However, the invention may be particularly well suited for use on sheet materials formed from thermoplastic polymers, sheet materials including but not limited to fibrous web sheets such as nonwoven webs such as spunbond, meltblown, carded webs and the like, and film materials such as blown films and cast films, and/or laminate materials including any of the preceding. Polymers generally suitable for fiber or film extrusion from a thermoplastic melt include the known polymers suitable for production of nonwoven webs and materials such as for example polyolefins, polyesters, polyamides, polycarbonates and copolymers and blends thereof. It should be noted that the polymer or polymers may desirably contain other additives such as processing aids or treatment compositions to impart desired properties to the filaments, residual amounts of solvents, pigments or colorants and the like.

Suitable polyolefins include polyethylene, e.g., high density polyethylene, medium density polyethylene, low density polyethylene and linear low density polyethylene; polypropylene, e.g., isotactic polypropylene, syndiotactic polypropylene, blends of isotactic polypropylene and atactic polypropylene; polybutylene, e.g., poly(1-butene) and poly (2-butene); polypentene, e.g., poly(1-pentene) and poly(2-pentene); poly(3-methyl-1-pentene); poly(4-methyl-1-pentene); and copolymers and blends thereof. Suitable copolymers include random and block copolymers prepared from two or more different unsaturated olefin monomers, such as ethylene/propylene and ethylene/butylene copolymers. Suitable polyamides include nylon 6, nylon 6/6, nylon 4/6, nylon 11, nylon 12, nylon 6/10, nylon 6/12, nylon 12/12, copolymers of caprolactam and alkylene oxide diamine, and the like, as well as blends and copolymers thereof. Suitable polyesters include poly(lactide) and poly(lactic acid) polymers as well as polyethylene terephthalate, polybutylene terephthalate, polytetramethylene terephthalate, polycyclohexylene-1,4-dimethylene terephthalate, and isophthalate copolymers thereof, as well as blends thereof.

In addition, many elastomeric polymers are known to be suitable for forming fibers and films. Elastic polymers useful may be any suitable elastomeric fiber or film forming resin including, for example, elastic polyesters, elastic polyurethanes, elastic polyamides, elastic co-polymers of ethylene and at least one vinyl monomer, block copolymers, and elastic polyolefins. Examples of elastic block copolymers include those having the general formula A-B-A' or A-B, where A and A' are each a thermoplastic polymer endblock that contains a styrenic moiety such as a poly (vinyl arene) and where B is an elastomeric polymer midblock such as a conjugated diene or a lower alkene polymer such as for example polystyrene-poly(ethylene-butylene)-polystyrene block copolymers. Also included are polymers composed of an A-B-A-B tetrablock copolymer, as discussed in U.S. Pat. No. 5,332,613 to Taylor et al. An example of such a tetrablock copolymer is a styrene-poly(ethylene-propylene)-styrene-poly(ethylene-propylene) or SEPSEP block copolymer. These A-B-A' and A-B-A-B copolymers are available in several different formulations from the Kraton Polymers of Houston, Tex. under the trade designation KRATON®.

Examples of elastic polyolefins include ultra-low density elastic polypropylenes and polyethylenes, such as those produced by "single-site" or "metallocene" catalysis methods. Such polymers are commercially available from the Dow Chemical Company of Midland, Mich. under the trade name ENGAGE®, and described in U.S. Pat. Nos. 5,278, 272 and 5,272,236 to Lai et al. entitled "Elastic Substantially Linear Olefin Polymers". Also useful are certain elastomeric polypropylenes such as are described, for example, in U.S. Pat. No. 5,539,056 to Yang et al. and U.S. Pat. No. 5,596,052 to Resconi et al., incorporated herein by reference in their entireties, and polyethylenes such as AFFINITY® EG 8200 from Dow Chemical of Midland, Mich. as well as EXACT® 4049, 4011 and 4041 from Exxon of Houston, Tex., as well as blends.

EXAMPLE

The deforming apparatus was similar to the one illustrated in FIG. 7, with a cord guide run similar to the one illustrated in FIG. 6 with an unending cord running in a helical pattern, and with the deforming roller positioned above the cord run. The deforming roller was capable of vertical movement such that a sheet material could be threaded between the cords and the deforming roller, and then the deforming roller could be lowered down onto the sheet material to press against the cords when it was desired to deform the sheet material. The deforming roll was a roller having peaks and grooves formed into its surface with a surface profile similar to that shown in FIG. 4 with an 11.5 centimeter outer diameter (measured at widest point). The peak-to-peak centerline distance was about 3.2 millimeters (mm) and the height of each peak (measured perpendicularly from the nadir or lowest point of the circumferential depression or groove) was about 4.4 mm. The peaks were about 0.76 mm thick, having very slightly sloping sidewalls rather than the parallel sidewalls shown in FIG. 4, such that the bases of the peaks were about 1.14 mm thick. The tops of the peaks were rounded to help avoid material damage, having a radius of about 0.38 mm. The cord was 0.8 mm diameter braided fibrous cord available from the Cortland Cable Company of Cortland, N.Y. comprising VECTRAN® liquid crystal polymer fibers (Celanese Acetate LLC, Charlotte, N.C.).

To test the deforming apparatus a monocomponent filament polypropylene spunbond nonwoven web sheet material available from the Kimberly-Clark Corporation (Irving, Tex.) was fed through the apparatus by unwinding the spunbond material from a roll of previously produced material. The feed direction through the apparatus was the same as the machine direction of the originally produced material. That is, the "machine direction" of the material is the direction of material production. The spunbond had a basis weight of about 0.4 ounces per square yard (about 13.6 grams per square meter). Because of the geometry and sizes of the features of the deforming roller (peaks and circumferential depressions or grooves formed between the peaks), the material was extended in the cross machine direction (i.e., the direction substantially perpendicular to the feed direction) to about 2.36 times its original undeformed cross machine directional width. Heat was applied to the sheet material by blowing air heated to about 210 degrees F. (about 99 degrees C.) upon the material while the material was held to the circumferential depressions of the deforming roller surface (note this also heated the deforming roller). The arc of wrap of the cords (and thus the sheet material) upon the deforming roller was approximately 40 degrees.

The deformed material permanently maintained a measure of the increased width such that it was about 130 percent of its original width after being deformed. By way of explanation, a 100 centimeter wide original sheet material, for example, permanently deformed to 130 percent of its original width, would be 130 centimeters wide after deforming. The sheet material after the deforming treatment also exhibited visible surface topographical features consistent with the shape of the deforming roller in that it maintained a visibly corrugated appearance, with longitudinal or machine direction corrugations running along its length and substantially evenly spaced across its cross machine direction width. In addition, it was observed that the sheet material following deformation felt much softer and more cloth-like to the touch and was more drapeable than the original, undeformed material.

It was further noted that the deforming process imparted a shape resiliency to the sheet material such that it was capable of cross machine extension upon forced extension and retraction upon release of the extending force. For example, when a given cross machine direction width of the deformed sheet material was extended by a light cross machine direction biasing force it extended in the cross machine direction and, upon release of the biasing force, returned to the cross machine direction width it had just prior to being extended. By a "light" force what is meant is enough force was used to extend the material in the cross machine direction to about 141 percent of its width prior to being extended, and enough to temporarily flatten out the set topographical corrugations, but not enough force to rupture or tear the sheet material.

While various patents have been incorporated herein by reference, to the extent there is any inconsistency between incorporated material and that of the written specification, the written specification shall control. In addition, while the invention has been described in detail with respect to specific embodiments thereof, it will be apparent to those skilled in the art that various alterations, modifications and other changes may be made to the invention without departing from the spirit and scope of the present invention. It is therefore intended that the claims cover all such modifications, alterations and other changes encompassed by the appended claims.

The invention claimed is:

1. A method for deforming a sheet material, said method comprising:
   a) providing a rotating deforming roller comprising a plurality of circumferential depressions;
   b) providing at least one cord, said cord aligned to fit within said depressions;
   c) providing at least one sheet material;
   d) feeding said sheet material in a first direction between said roller and said cord; and
   e) deforming said sheet material by pressing said sheet material at least partially into said circumferential depressions with said cord.

2. The method of claim 1 wherein said deformation comprises extension of said sheet material in a direction substantially perpendicular to said first direction.

3. The method of claim 1 wherein said circumferential depressions are grooves formed between circumferential peaks.

4. The method of claim 3 wherein said circumferential peaks comprise projections and wherein said deformation comprises aperturing said sheet material.

5. The method of claim 1 wherein said circumferential depressions are formed between land areas.

6. The method of claim 1 further comprising applying heat to said sheet material.

7. The method of claim 6 wherein said deformation comprises forming topographical features in said sheet material.

8. The method of claim 1 wherein said sheet material comprises a nonwoven web material.

9. The method of claim 1 wherein said sheet material comprises a film material.

10. The method of claim 2 wherein said sheet material comprises a nonwoven web material.

11. The method of claim 2 wherein said sheet material comprises a film material.

12. The method of claim 2 wherein said sheet material comprises a laminate comprising a nonwoven web material and a film material.

* * * * *